United States Patent
Yamazaki et al.

(10) Patent No.: US 7,420,785 B2
(45) Date of Patent: Sep. 2, 2008

(54) SUSPENSION ASSEMBLY, HARD DISK DRIVE, AND METHOD OF MANUFACTURING SUSPENSION ASSEMBLY

(75) Inventors: Hiroshi Yamazaki, Tokyo (JP); Ken Unno, Tokyo (JP); Kenichi Tochi, Tokyo (JP); Masahiro Miyazaki, Tokyo (JP); Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 385 days.

(21) Appl. No.: 11/054,280

(22) Filed: Feb. 10, 2005

(65) Prior Publication Data

US 2005/0195531 A1 Sep. 8, 2005

(30) Foreign Application Priority Data

Mar. 3, 2004 (JP) ............................ P2004-059806

(51) Int. Cl.
G11B 21/24 (2006.01)
(52) U.S. Cl. .................................. 360/294.4
(58) Field of Classification Search ............... 360/294.4, 360/75, 78.05, 245.3
See application file for complete search history.

(56) References Cited

U.S. PATENT DOCUMENTS

| | | | |
|---|---|---|---|
| 6,617,762 B2 | 9/2003 | Kurano et al. | |
| 6,618,220 B2 * | 9/2003 | Inagaki et al. | 360/78.05 |
| 6,747,848 B2 * | 6/2004 | Kasajima et al. | 360/245.3 |
| 6,785,096 B2 * | 8/2004 | Kuwajima et al. | 360/294.4 |
| 6,807,030 B1 * | 10/2004 | Hawwa et al. | 360/294.4 |
| 6,831,815 B2 * | 12/2004 | Kasajima et al. | 360/294.4 |
| 6,870,709 B2 * | 3/2005 | Shimanouchi et al. | 360/294.4 |
| 6,870,710 B2 * | 3/2005 | Hida et al. | 360/294.4 |
| 6,917,498 B2 * | 7/2005 | Kuwajima et al. | 360/294.4 |
| 6,943,990 B1 | 9/2005 | Yokoyama et al. | |
| 6,950,266 B1 * | 9/2005 | McCaslin et al. | 360/75 |
| 7,006,334 B2 * | 2/2006 | Uchiyama | 360/294.4 |
| 7,061,724 B2 * | 6/2006 | Koganezawa | 360/294.4 |
| 7,068,474 B2 * | 6/2006 | Kuwajima et al. | 360/294.4 |
| 7,218,482 B2 * | 5/2007 | Yao et al. | 360/294.4 |
| 2001/0021086 A1 | 9/2001 | Kuwajima et al. | |
| 2002/0048124 A1 | 4/2002 | Kuwajima et al. | |
| 2002/0145831 A1 * | 10/2002 | Nakagawa | 360/294.4 |
| 2003/0179697 A1 | 9/2003 | Kuwajima et al. | |
| 2004/0095663 A1 | 5/2004 | Kuwajima et al. | |
| 2004/0095685 A1 | 5/2004 | Kuwajima et al. | |
| 2004/0095686 A1 | 5/2004 | Kuwajima et al. | |
| 2004/0100736 A1 | 5/2004 | Kuwajima et al. | |

FOREIGN PATENT DOCUMENTS

| | | |
|---|---|---|
| JP | A 2001-332041 | 11/2001 |
| JP | A 2002-134807 | 5/2002 |
| JP | A-2002-141569 | 5/2002 |
| JP | A 2002-203384 | 7/2002 |
| WO | WO 00/16318 | 3/2000 |

* cited by examiner

*Primary Examiner*—Tianjie Chen
(74) *Attorney, Agent, or Firm*—Oliff & Berridge, PLC

(57) ABSTRACT

A head slider having a thin film magnetic head is mounted on a suspension assembly. The suspension assembly is comprised of a metal plate-like member, and a piezoelectric actuator for displacing the head slider relative to the suspension assembly. The piezoelectric actuator has a piezoelectric film, and a pair of electrode films placed so as to sandwich the piezoelectric film in between. The piezoelectric film and the pair of electrode films are formed in an order of one electrode film, the piezoelectric film, and the other electrode film on the plate-like member.

6 Claims, 17 Drawing Sheets

Fig.15
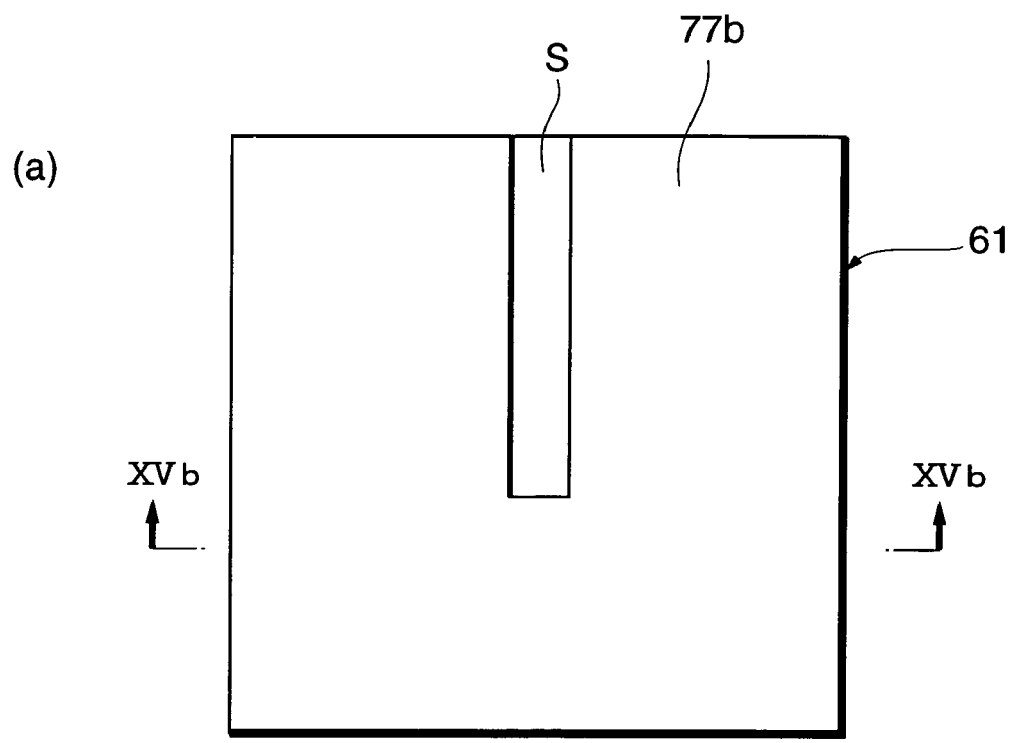
(a)
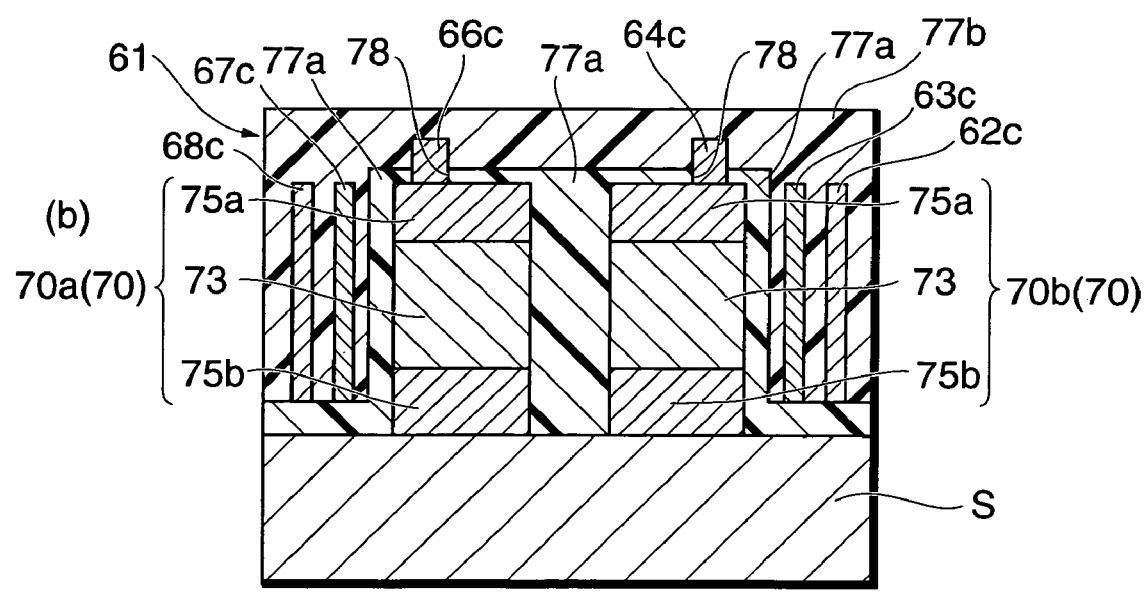
(b)

Fig.16
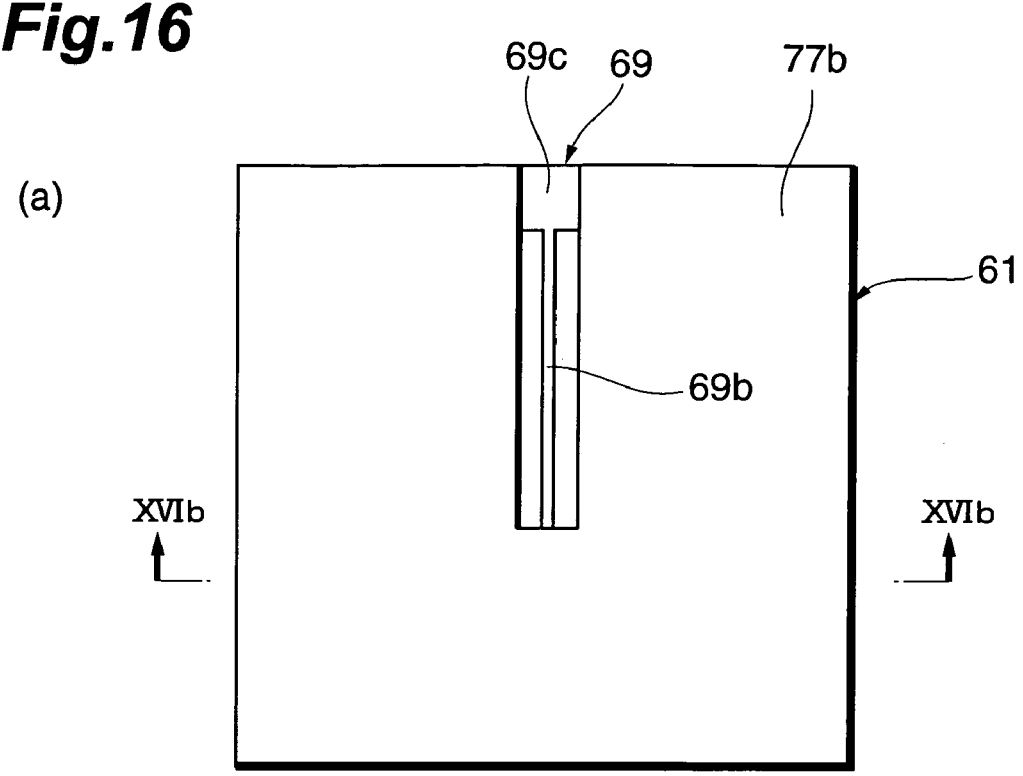
(a)
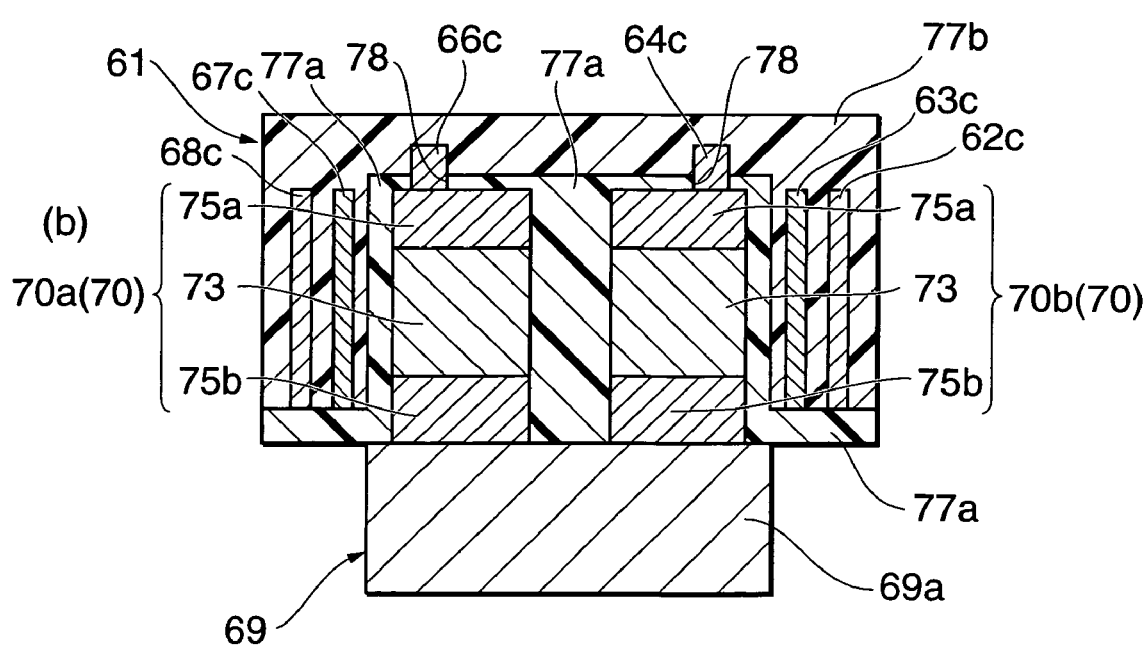
(b)

SUSPENSION ASSEMBLY, HARD DISK DRIVE, AND METHOD OF MANUFACTURING SUSPENSION ASSEMBLY

BACKGROUND OF THE INVENTION

1. Field of the Invention

The present invention relates to a suspension assembly, a hard disk drive, and a method of manufacturing a suspension assembly.

2. Related Background Art

A thin film magnetic head for recording and reproducing magnetic information in and from a recording medium such as a hard disk is formed in a so-called head slider. This head slider is mounted on a tip region of a suspension assembly, thereby constructing a head gimbal assembly (HGA). In general, this suspension assembly is constructed by placing a flexible flexure over a load beam of stainless steel or the like, and read/write wires of the thin film magnetic head are provided on the flexure. The base end side of this suspension assembly is coupled to an actuator arm driven by a voice coil motor (VCM). A VCM coil or the like is attached to the interconnected structure of the suspension assembly and the actuator arm, thereby constructing a so-called head stack assembly (HSA).

With recent tendencies toward higher recording densities of hard disks, particularly, toward narrower track widths, there are demands for a technology of driving the head slider by a small amount with high accuracy. There was thus a conventional proposal of the head gimbal assembly in which a piezoelectric actuator making use of a piezoelectric element was placed at the interconnected part between the suspension assembly and the actuator arm, as described in Japanese Patent Application Laid-Open No. 2002-134807. This is a so-called two step motion type assembly, in which the first step is to control relatively large movement of the thin film magnetic head by drive of the actuator arm by the voice coil motor and in which the second step is to control fine movement such as tracking compensation by drive of the suspension assembly by the piezoelectric actuator.

In the head gimbal assembly of this two step motion type as described above, however, the whole of the long suspension assembly needs to be driven by the piezoelectric actuator, and there was thus a limit to achievement of higher accuracy of tracking.

For this reason, there is another proposal of an apparatus in which the piezoelectric actuator is placed between the head slider and the suspension assembly, for example, as disclosed in Japanese Patent Application Laid-Open No. 2002-203384. In this apparatus, the thin film piezoelectric element does not have to drive the long suspension assembly itself, but is able to directly drive the head slider, thus achieving higher-accuracy tracking.

SUMMARY OF THE INVENTION

However, the aforementioned conventional head gimbal assembly had the following problem. Namely, on the occasion of mounting the piezoelectric actuator on the suspension assembly, it is fixed with an adhesive, and it is difficult to handle the piezoelectric actuator singly because of the small size of the piezoelectric actuator, which results in decrease of yield.

An object of the present invention is to provide a suspension assembly, a hard disk drive, and a method of manufacturing a suspension assembly, while enabling enhancement of mass productivity.

A suspension assembly according to the present invention is a suspension assembly on which a head slider having a thin film magnetic head is to be mounted, the suspension assembly comprising: a metal plate-like member; and a piezoelectric actuator for displacing the head slider relative to the suspension assembly, wherein the piezoelectric actuator comprises a piezoelectric film, and a pair of electrode films placed so as to sandwich the piezoelectric film in between, and wherein the piezoelectric film and the pair of electrode films are formed in an order of one electrode film, the piezoelectric film, and the other electrode film on the plate-like member.

In the suspension assembly according to the present invention, the piezoelectric actuator is not bonded to the plate-like member, but is formed on the plate-like member. This obviates the need for the bonding step for fixing the piezoelectric actuator to the plate-like member, thereby achieving simplification of the production process.

In the present invention, the mechanical strength of the piezoelectric actuator is maintained by the plate-like member, so as to successfully prevent breakage of the piezoelectric actuator. The piezoelectric actuator is not handled singly, but is handled together with the plate-like member, thereby facilitating handling thereof. These improve the yield.

Preferably, the suspension assembly further comprises a transfer plate facing the piezoelectric actuator on one side, facing the head slider on the other side, and arranged to transfer displacement of the piezoelectric actuator to the head slider, and the piezoelectric film and the pair of electrode films are formed in the order of the one electrode film, the piezoelectric film, and the other electrode film on the transfer plate, while the transfer plate serves as the plate-like member. In this case, the piezoelectric actuator is handled together with the transfer plate, so as to facilitate mounting or the like thereof on the other members included in the suspension assembly.

Preferably, the suspension assembly further comprises a flexure which has a flexible substrate with wires electrically connected to the thin film magnetic head, and a support plate for supporting at least a portion of the flexible substrate, and the piezoelectric film and the pair of electrode films are formed in the order of the one electrode film, the piezoelectric film, and the other electrode film on the support plate, while the support plate serves as the plate-like member. In this case, the piezoelectric actuator is handled together with the support plate, so as to facilitate mounting or the like thereof on the other members included in the suspension assembly.

A hard disk drive according to the present invention is a hard disk drive comprising a recording medium; a head slider having a thin film magnetic head for performing at least one of recording and reproduction with the recording medium; and a suspension assembly on which the head slider is mounted, wherein the suspension assembly comprises: a metal plate-like member; and a piezoelectric actuator for displacing the head slider relative to the suspension assembly, wherein the piezoelectric actuator comprises a piezoelectric film, and a pair of electrode films placed so as to sandwich the piezoelectric film in between, and wherein the piezoelectric film and the pair of electrode films are formed in an order of one electrode film, the piezoelectric film, and the other electrode film on the plate-like member.

In the hard disk drive according to the present invention, the piezoelectric actuator is not bonded to the plate-like member, but is formed on the plate-like member, so as to achieve simplification of the production process and improve the yield.

A manufacturing method of a suspension assembly according to the present invention is a method of manufacturing a suspension assembly comprising a metal plate-like member of a predetermined shape, and a piezoelectric actuator for causing relative displacement of a head slider having a thin film magnetic head, in which the piezoelectric actuator comprises a piezoelectric film, and a pair of electrode films placed so as to sandwich the piezoelectric film in between, the method comprising: a step of forming one electrode film, the piezoelectric film, and the other electrode film in the order named, on a metal substrate, thereby forming the piezoelectric actuator; and a step of, after the step of forming the piezoelectric actuator, processing the substrate into the predetermined shape to form the plate-like member.

In the manufacturing method of the suspension assembly according to the present invention, the piezoelectric actuator is not bonded to the plate-like member but is formed on the substrate, and thereafter the substrate is processed into the predetermined shape, thereby obtaining the plate-like member on which the piezoelectric actuator is formed. This obviates the need for the bonding step for fixing the piezoelectric actuator to the plate-like member, so as to achieve simplification of the production process.

According to the present invention, the mechanical strength of the piezoelectric actuator is maintained by the substrate or the plate-like member during the manufacturing process, so as to successfully prevent breakage of the piezoelectric actuator. The piezoelectric actuator is not handled singly, but is handled together with the substrate or the plate-like member, so as to facilitate the handling thereof. These improve the yield.

Preferably, the step of forming the piezoelectric actuator comprises depositing on the substrate a thin film of a material forming the one electrode film, a thin film of a material forming the piezoelectric film, and a thin film of a material forming the other electrode film, in the order named to form a laminate, and thereafter performing patterning of the laminate to form the piezoelectric actuator, and the step of forming the plate-like member comprises etching the substrate having the piezoelectric actuator formed, from a side opposite to a surface on which the piezoelectric actuator is formed in the substrate, so as to form the predetermined shape. In this case, it is feasible to readily obtain the plate-like member on which the piezoelectric actuator is formed without being bonded.

Preferably, the step of forming the piezoelectric actuator comprises applying onto the substrate a material forming the one electrode film, a material forming the piezoelectric film, and a material forming the other electrode film, in the order named to form a laminate, and thereafter sintering the laminate to form the piezoelectric actuator, and the step of forming the plate-like member comprises etching the substrate having the piezoelectric actuator formed, from a side opposite to a surface on which the piezoelectric actuator is formed in the substrate, so as to form the predetermined shape. In this case, it is feasible to readily obtain the pate-like member on which the piezoelectric actuator is formed without being bonded.

Preferably, the step of forming the piezoelectric actuator comprises forming a resin film so as to cover the one electrode film, the piezoelectric film, and the other electrode film after formed. In this case, the resin film protects the one electrode film, the piezoelectric film, and the other electrode film after formed.

Preferably, the step of forming the resin film in the step of forming the piezoelectric actuator comprises forming a first resin film so as to cover the one electrode film, the piezoelectric film, and the other electrode film after formed, forming wires on the first resin film, and thereafter forming a second resin film on the first resin film so as to cover the wires. In this case, the first and second resin films protect the one electrode film, the piezoelectric film, and the other electrode film after formed, and the second resin film protects the wires.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 15 is a schematic diagram for explaining the manufacturing process of the piezoelectric actuator.

FIG. 16 is a schematic diagram for explaining the manufacturing process of the piezoelectric actuator.

DESCRIPTION OF THE PREFERRED EMBODIMENTS

The preferred embodiments of the present invention will be described below in detail with reference to the accompanying drawings. Identical elements or elements having identical functions will be denoted by the same reference symbols throughout the description, without redundant description.

First Embodiment

Figure 1:
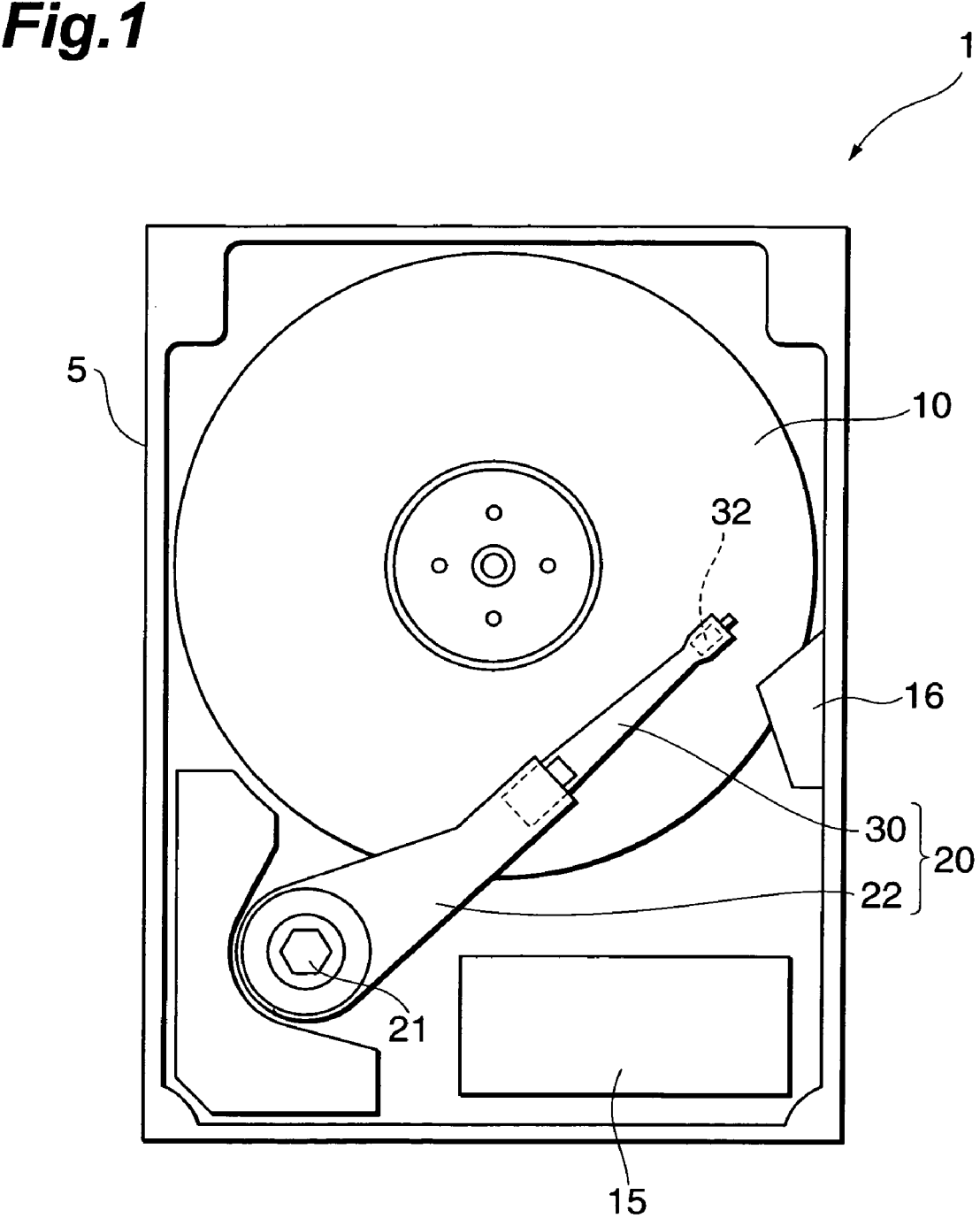
FIG. 1 is an illustration showing a hard disk drive in the first embodiment.

FIG. 1 is a schema tic configuration diagram showing a hard disk drive of the first embodiment. The hard disk drive 1 has a hard disk 10 as a recording is medium, and a head stack assembly (HSA) 20 for recording and reproducing magnetic information onto and from the hard disk 10, in a case 5. The hard disk 10 is arranged to be rotated by an unrepresented motor. Furthermore, the hard disk drive 1 incorporates a controller 15 for performing various controls such as recording and reproduction of information onto and from the hard disk 10, and a ramp mechanism 16 for setting a thin film magnetic head back from the position above the hard disk 10.

The head stack assembly 20 consists of a stack of plural assemblies stacked in the depth direction of the drawing, each assembly consisting of an actuator arm 22 supported rotatably about an axis 21 by a voice coil motor (VCM), and a head gimbal assembly (hereinafter referred to as "HGA") 30 connected to this actuator arm 22. A head slider 32 is mounted on the HGA 30 so as to face the hard disk 10.

The HGA 30 adopts the mode of moving the thin film magnetic head 31 in two steps, and a piezoelectric actuator 70 is provided in order to implement this mode. The piezoelectric actuator 70 is an actuator for displacing the head slider 32 relative to a support beam portion 50. Relatively large movement of the thin film magnetic head is controlled by driving of the whole of suspension assembly 40 and actuator arm 22 by the voice coil motor. Fine movement of the thin film magnetic head is controlled by driving of the head slider 32 by the piezoelectric actuator 70.

Figure 3:
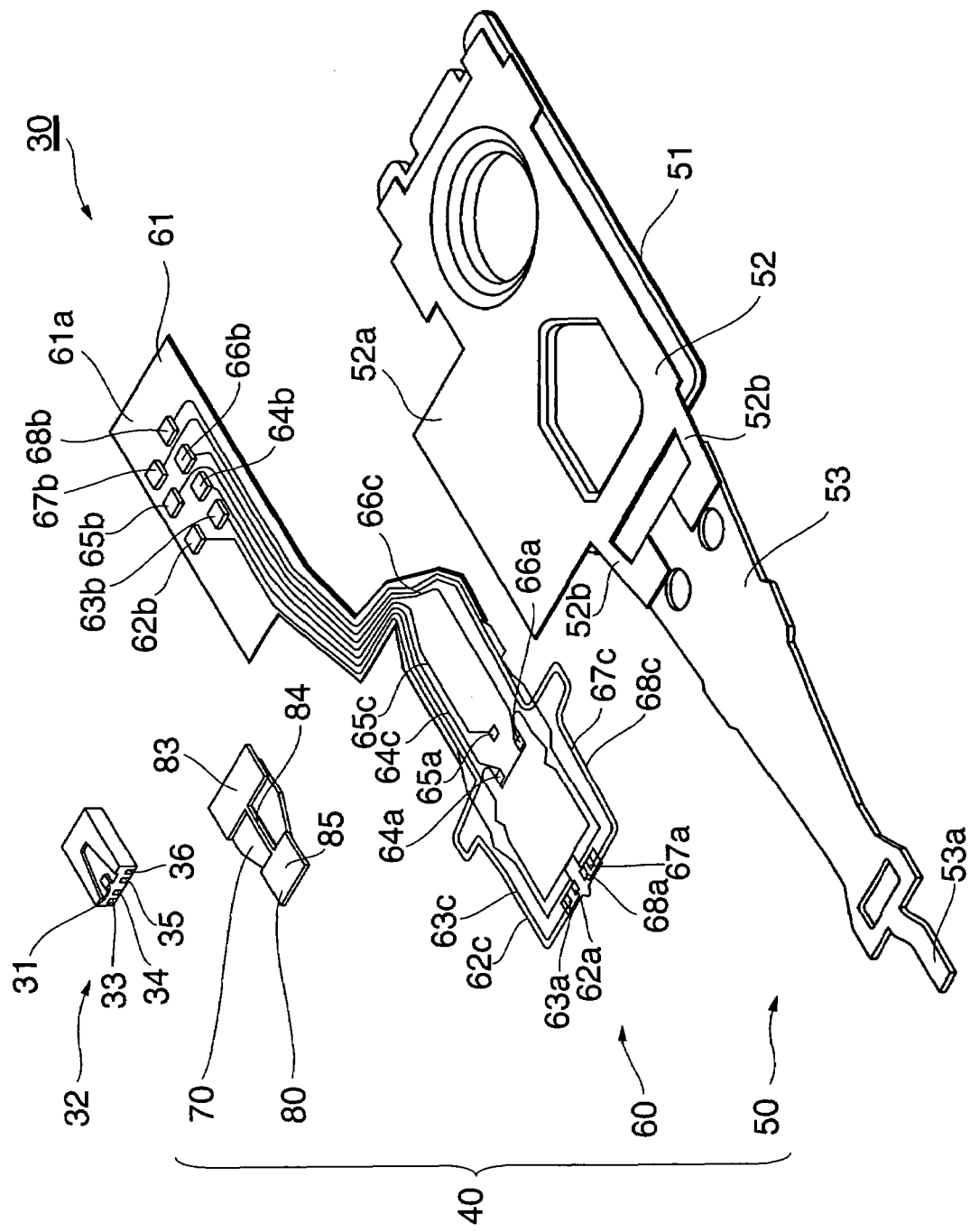
FIG. 3 is an exploded perspective view of the HGA.

The support beam portion 50 is comprised of a base plate 51, a connection plate 52 attached thereto, and a load beam 53. The connection plate 52 is thinner and more flexible than the base plate. The connection plate 52 is constructed with a projection 52a of rectangular shape projecting laterally, and a pair of connection pieces 52b, 52b extending apart from each other, as shown in FIG. 3. The load beam 53 is swingably coupled to each of the connection pieces 52b, 52b. The distal end of the load beam 53 is formed as a tab 53a which is arranged to slide up a slope during a receding operation of the head slider 32 to the ramp mechanism 16. The side opposite to the side where the load beam 53 is provided, in the base plate 51, is the side where the base plate is connected to the actuator arm 22. The connection plate 52 and the load beam 53 may be integrally formed.

The suspension assembly 40 has a flexure 60. This flexure 60 has a flexible substrate 61 made of a polyimide resin or the like. A support plate of thin plate shape (not shown) made of stainless steel or the like is attached in part to the bottom surface of the substrate 61. The flexure 60 is bonded to the support beam portion 50 by laser spot welding. The substrate 61 has a pad mount region 61a on the rear end side thereof. The pad mount region 61a is to be laid on the projection 52a of the connection plate 52.

Electrodes 62b, 63b for recording, electrodes 64b-66b for the piezoelectric actuator, and electrodes 67b, 68b for reproduction are mounted on the pad mount region 61a of the flexure 60. On the other hand, as shown in the enlarged view of FIG. 4, four electrodes 62a, 63a, 67a, and 68a are arrayed at the tip of the flexure 60. In addition, three electrodes 64a-66a are arranged behind the four electrodes 62a, 63a, 67a, and 68a of the flexure 60. The electrodes 62a-68a are electrically connected through respective wires 62c-68c to the electrodes 62b-68b, respectively. Each wire 62c-68c is coated with an insulating film in practice. The wires 62c-68c on the substrate 61 can be formed, for example, by a film-forming technique such as plating.

Figure 2:
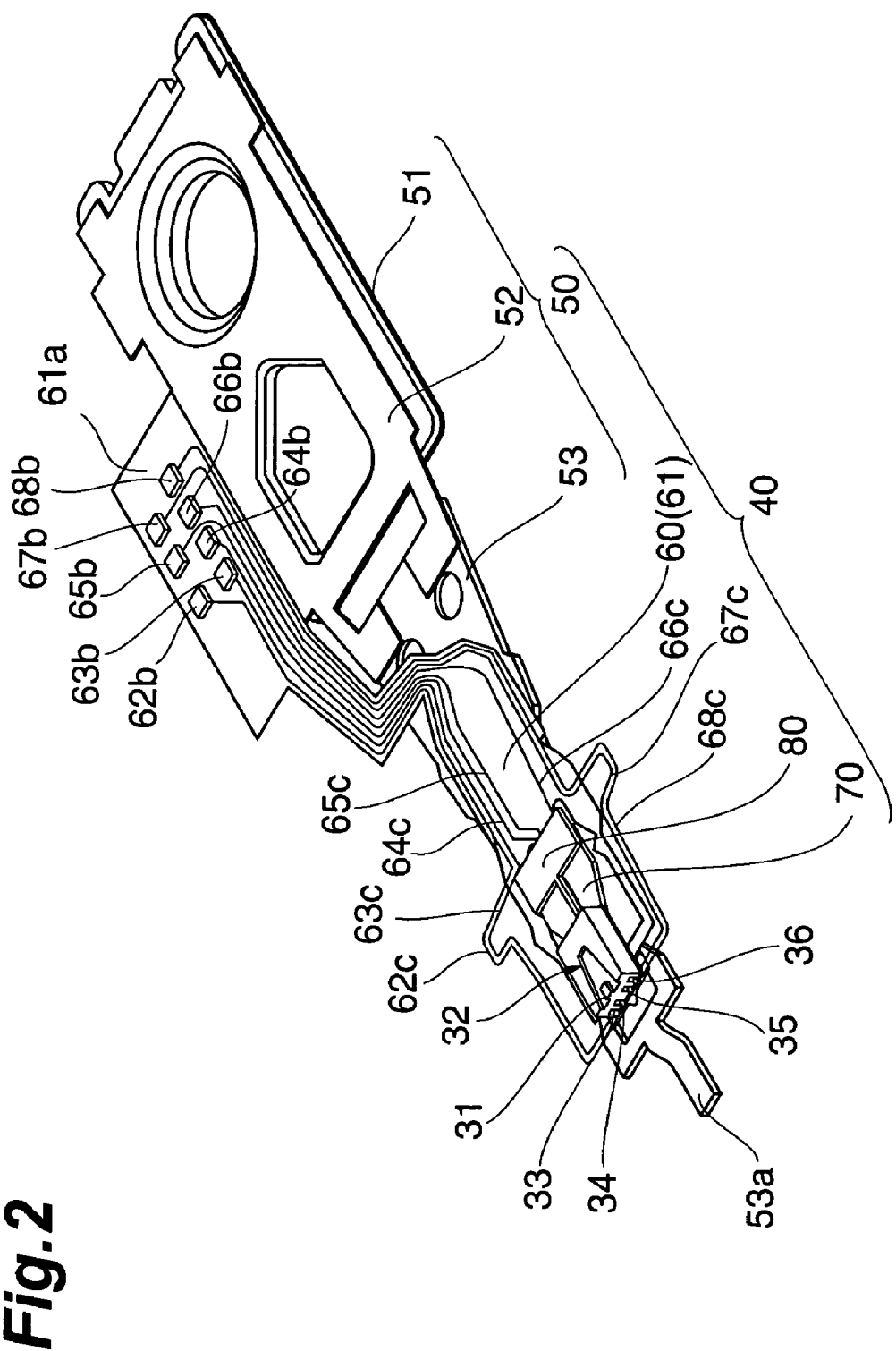
FIG. 2 is a perspective view showing a head gimbal assembly (HGA) in the first embodiment.

The electrodes 62a, 63a are connected to recording pads 33, 34, respectively, of the head slider 32. The electrodes 67a, 68a are connected to reproduction pads 35, 36, respectively. These electrodes are connected to each other by gold ball bonding as shown in FIG. 2.

Figure 4:
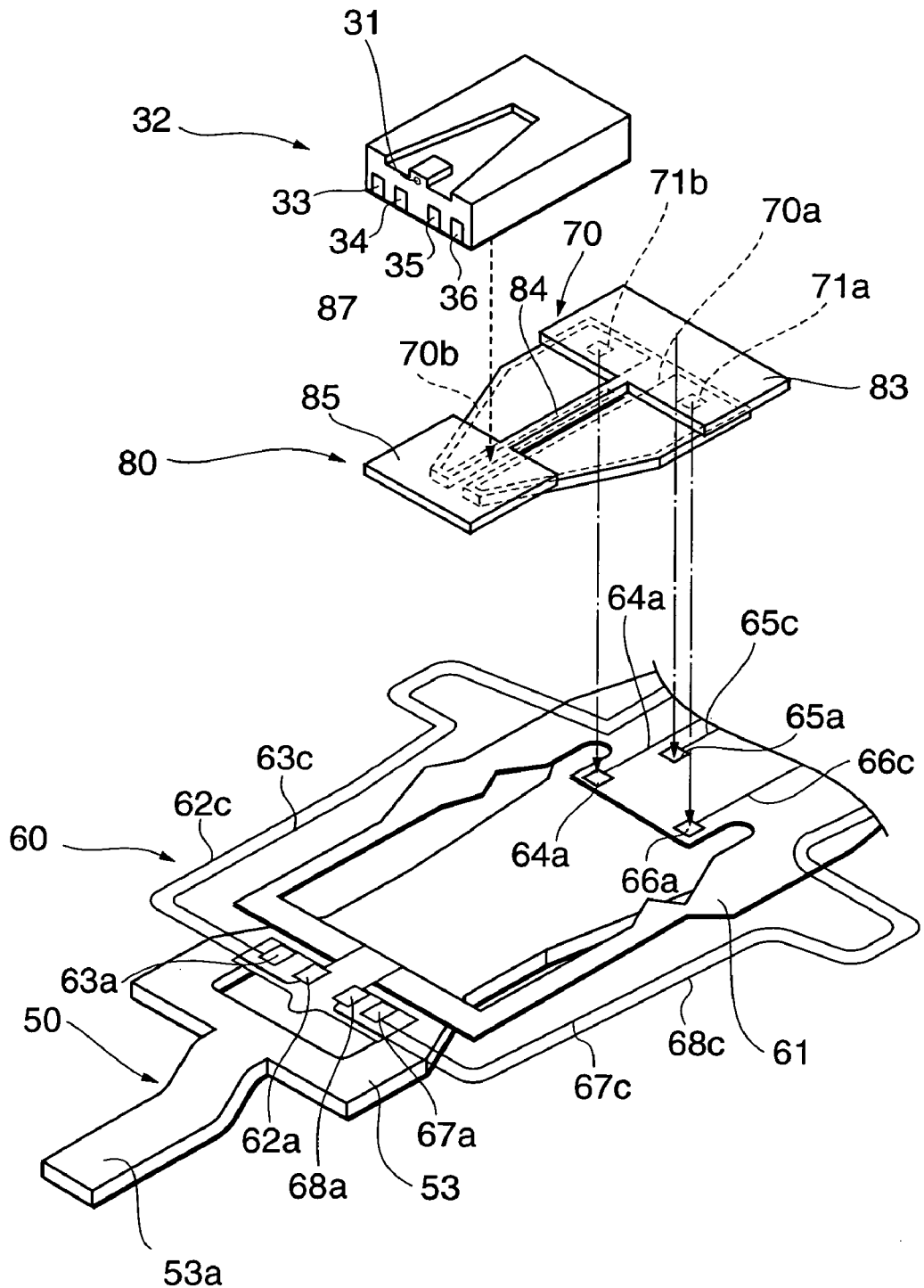
FIG. 4 is an exploded perspective view of components near the tip of a flexure of the HGA.

The details of the piezoelectric actuator 70 will be described below with reference to FIGS. 4 and 5. The piezoelectric actuator 70 has a first region 70a and, a second region 70b constructed to expand and contract in mutually different directions. Each region 70a, 70b is comprised of a thin film piezoelectric element of PZT or the like and the periphery thereof is coated with resin. The thin film piezoelectric element has various advantages of a lighter weight, better frequency characteristics against vibration, a wider range for installation, and controllability at a low voltage, as compared with thick film elements.

The first region 70a and the second region 70b are integrated by resin near their root but are separated from each other on the tip side where they are tapered. Electrodes 71a, 71b to each of which a predetermined drive voltage is applied are provided on the bottom side of the piezoelectric actuator 70 in the drawing. These electrodes 71a, 71b are electrically connected directly, or indirectly through an electrically conductive member to the electrodes 66a, 64a on the flexure 60.

As the electrodes 71a, 71b are connected to the electrodes 66a, 64a, the root region near the electrodes 71a, 71b of the piezoelectric actuator 70 is bonded to the substrate 61 of the flexure 60. On the other hand, the region on the tip side with respect to the root region is located in an opening region of the flexure 60, and thus faces the load beam 53.

Figure 5:
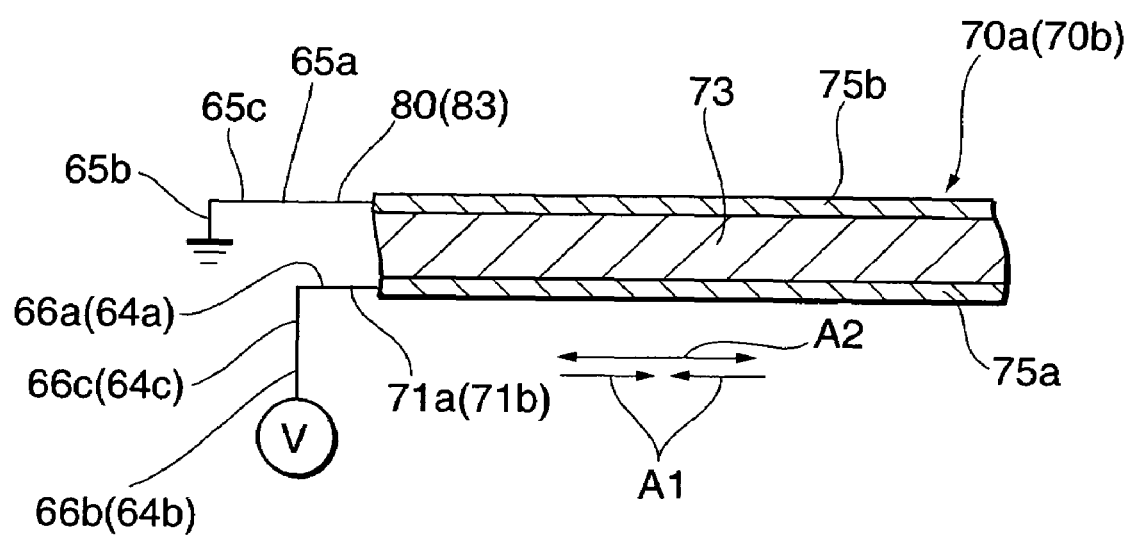
FIG. 5 is a schematic diagram for explaining a configuration of a piezoelectric actuator.

Each of the first region 70a and the second region 70b, as shown in FIG. 5, has a thin film piezoelectric 73, and first and second electrode films 75a, 75b placed so as to sandwich the thin film piezoelectric 73 in between. The thin film piezoelectric 73, the first electrode film 75a, and the second electrode film 75b are formed in the order of the second electrode film 75b, the thin film piezoelectric 73, and the first electrode film 75a on a transfer plate 80 described later.

The first electrode film 75a is electrically connected to the electrode 71a (71b). The second electrode film 75b is electrically connected to the transfer plate 80 and the transfer plate 80 is electrically connected directly, or indirectly through an electrically conductive member to the electrode 65a on the flexure 60. This makes the second electrode film 75b connected to the ground potential through the transfer plate 80, electrode 65a, wire 65c, and electrode 65b. Instead of the electrode extraction of the second electrode film 75b through the transfer plate 80, the electrode extraction of the second electrode film 75b may be implemented by providing a separate electrode electrically connected to the second electrode film 75b and electrically connecting the electrode to the electrode 65a.

A drive voltage for driving the thin film piezoelectric 73 is applied to each of the electrodes 71a, 71b. With application of the drive voltage, as shown in FIG. 5, the thin film piezoelectric 73 expands or contracts in directions of arrows A1, A2 in accordance with the drive voltage. The drive voltages applied to the respective electrodes 71a, 71b are opposite in phase to each other, for example, with respect to the center of a bias voltage. When the positive drive voltage relative to the bias voltage is applied to the electrode 71a, the thin film piezoelectric 73 in the first region 70a contracts in the directions of arrows A1. On the other hand, when the negative drive voltage relative to the bias voltage is applied to the electrode 71b, the thin film piezoelectric 73 in the second region 70b expands in the directions of arrows A2.

Figure 17:
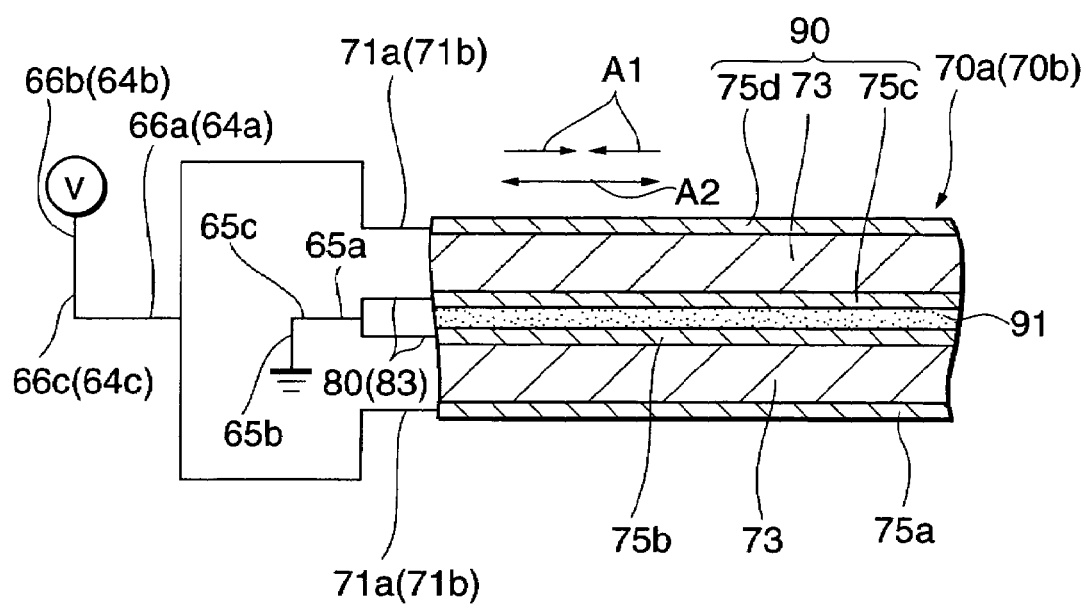
FIG. 17 is a schematic diagram for explaining a configuration of a piezoelectric actuator.

The first region 70a and the second region 70b may be formed in a double layer structure in which two thin film piezoelectrics are stacked, as shown in FIG. 17. A laminate 90 is fixed onto the second electrode film 75b with an adhesive 91. The laminate 90 includes a thin film piezoelectric 73, and a third electrode metal film 75c and a fourth electrode metal film 75d placed so as to sandwich the thin film piezoelectric 73 in between. The second electrode film 75b and the third electrode metal film 75c are bonded with the adhesive 91.

The first electrode metal film 75a and the fourth electrode metal film 75d are electrically connected to the electrode 71a. The second electrode metal film 75b and the third electrode metal film 75c are electrically connected to the transfer plate 80. A drive voltage for driving each of the two thin film piezoelectrics 73 is applied to each of the electrodes 71a, 71b. With application of the drive voltage, as shown in FIG. 17, the two thin film piezoelectrics 73 expand or contract in directions of arrows A1, A2 in accordance with the drive voltage. The drive voltages applied to the respective electrodes 71a, 71b are opposite in phase to each other, for example, with respect to the center of the bias voltage. When the positive drive voltage relative to the bias voltage is applied to the electrode 71a, the two thin film piezoelectrics 73 in the first region 70a contract in the directions of arrows A1. On the other hand, when the positive drive voltage relative to the bias voltage is applied to the electrode 71b, the two thin film piezoelectrics 73 in the second region 70b expand in the directions of arrows A2. The first region 70a and the second region 70b may also be constructed in a multilayer structure in which three or more thin film piezoelectrics are stacked.

The suspension assembly 40 of the present embodiment has the transfer plate 80 for transferring displacement of the piezoelectric actuator 70 to the head slider 32. The transfer plate 80 has one surface (the lower surface in FIG. 4) facing the piezoelectric actuator 70, and the other surface facing the head slider 32. The transfer plate 80 is made of an electrically conductive metal, e.g., stainless steel or the like. The transfer plate 80, as also shown in FIG. 4, has a rear part 83 of rectangular shape extending in the width direction, and a front part 85 connected through a thin and long connection 84 to the rear part 83.

Figure 6:
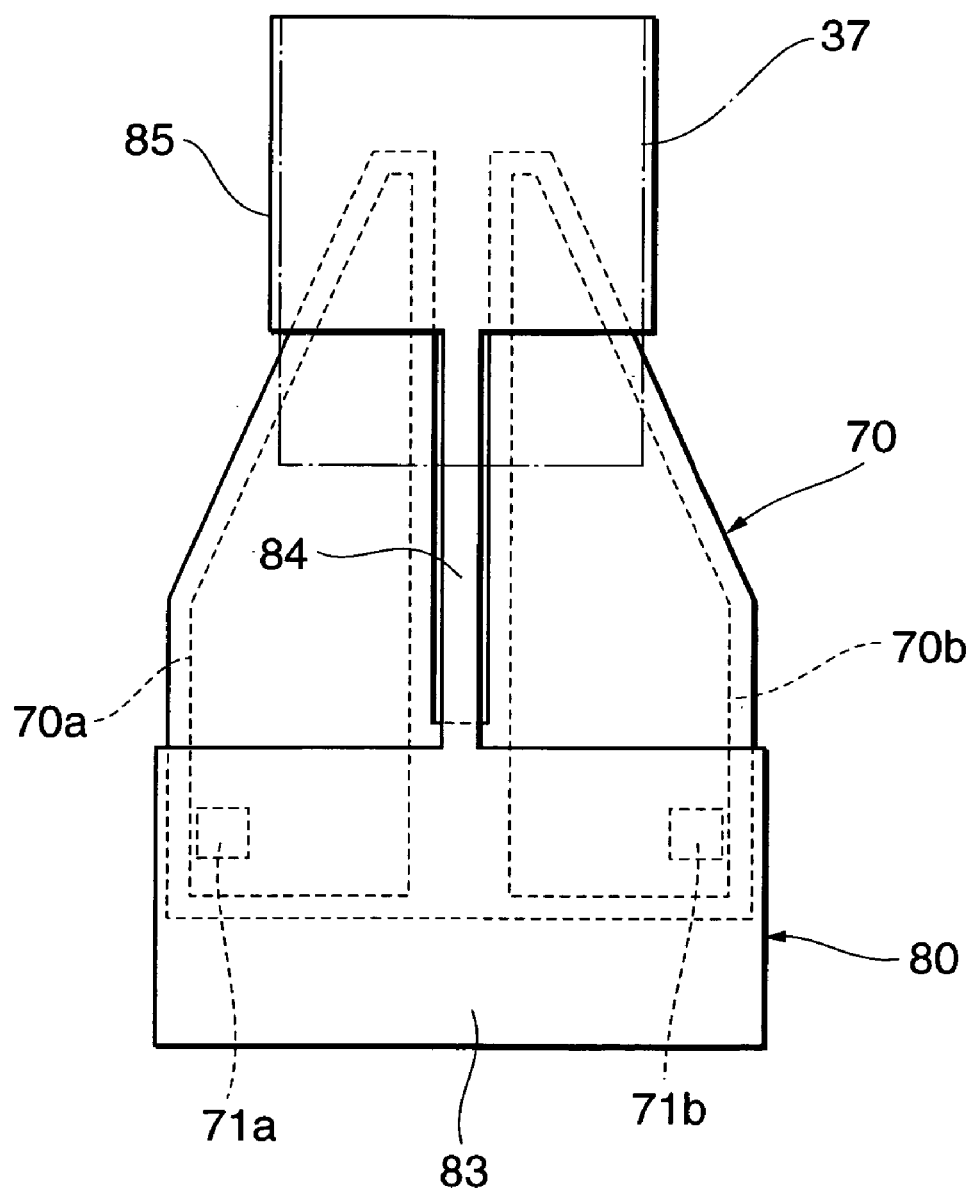
FIG. 6 is a plan view of a piezoelectric actuator and a transfer plate.

Here the positional relation among the head slider 32, the piezoelectric actuator 70, and the transfer plate 80 will be described with reference to FIG. 6. FIG. 6 is a view from the so-called air bearing surface of the head slider 32 facing the hard disk 10. The head slider 32 is mounted on the front part 85 of the transfer plate 80. The piezoelectric actuator 70 is located below the transfer plate 80, and is so located that the root part thereof where the electrodes 71a, 71b are located overlaps the rear part 83 of the transfer plate 80 and that the tip part of the first region 70a and the second region 70b overlaps the front part 85.

Figure 7:
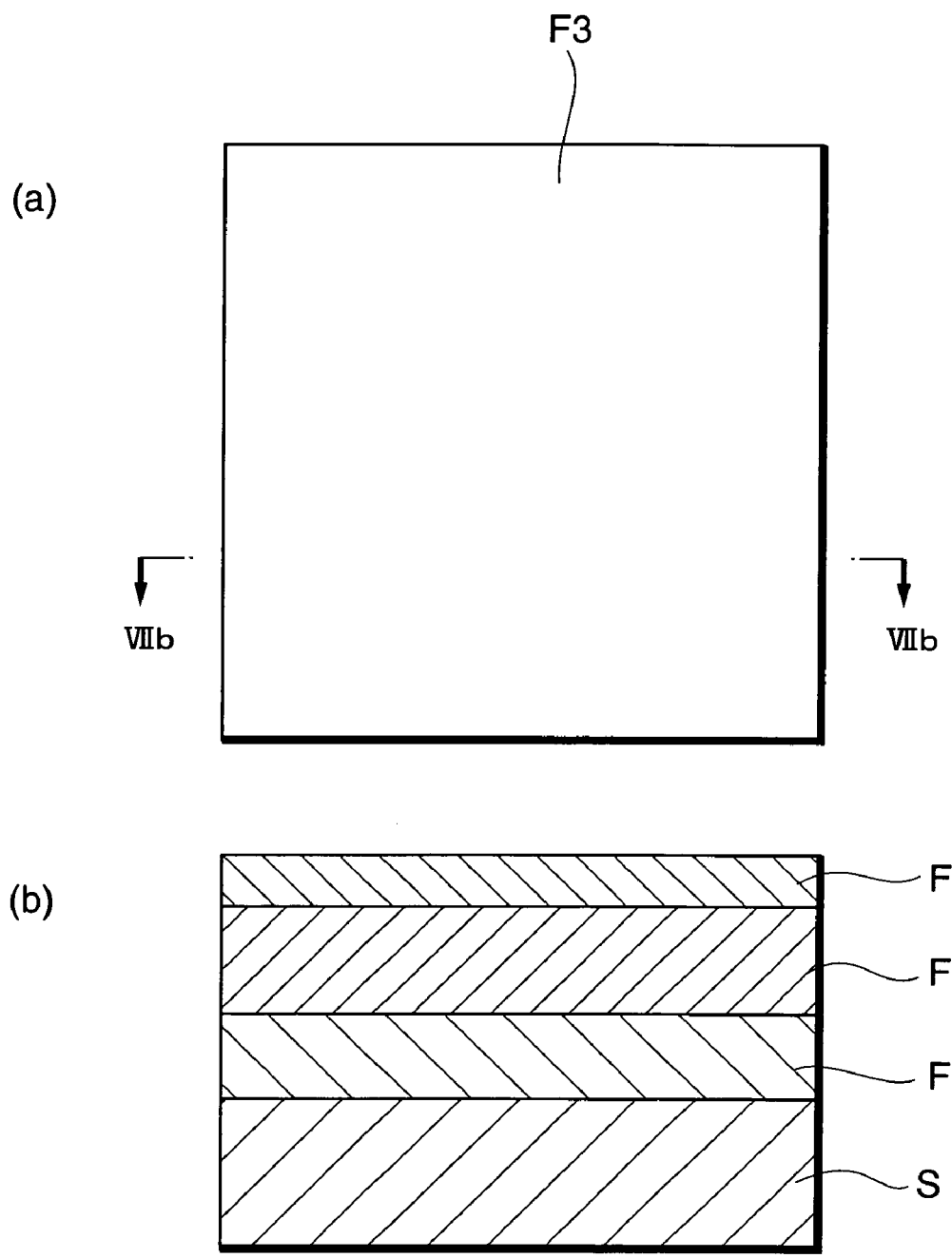
FIG. 7 is a schematic diagram for explaining a manufacturing process of a piezoelectric actuator.
Figure 8:
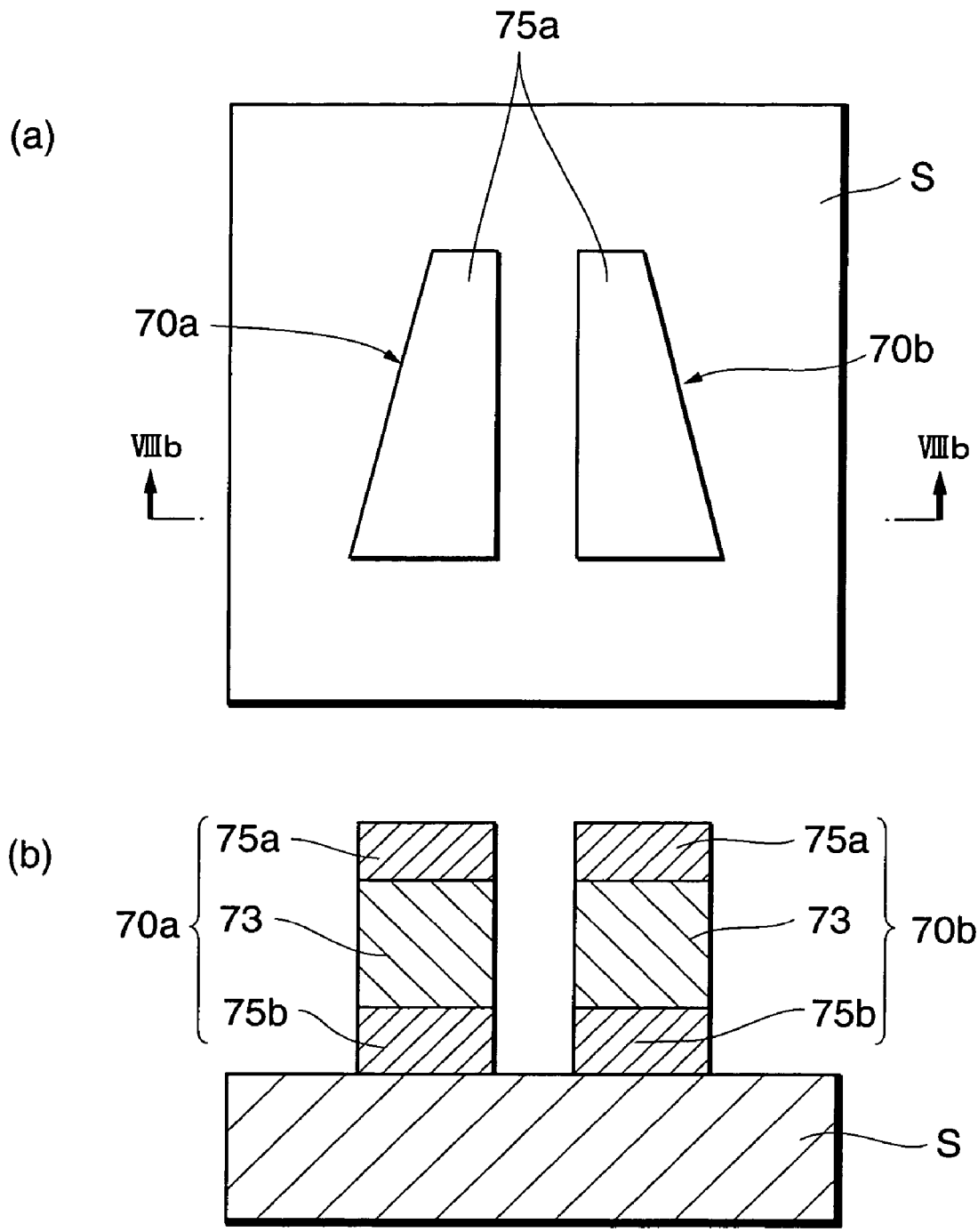
FIG. 8 is a schematic diagram for explaining the manufacturing process of the piezoelectric actuator.
Figure 9:
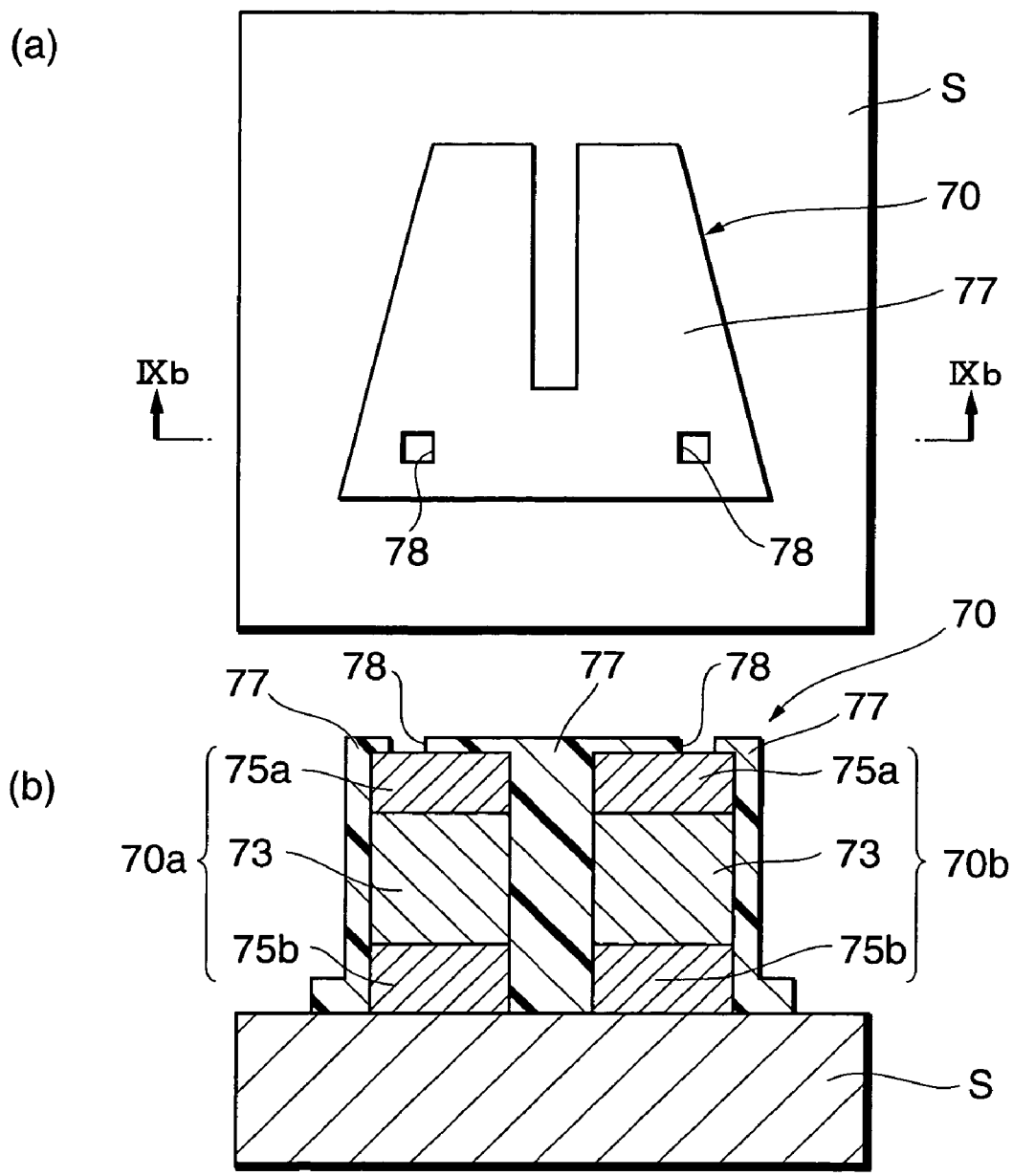
FIG. 9 is a schematic diagram for explaining the manufacturing process of the piezoelectric actuator.
Figure 10:
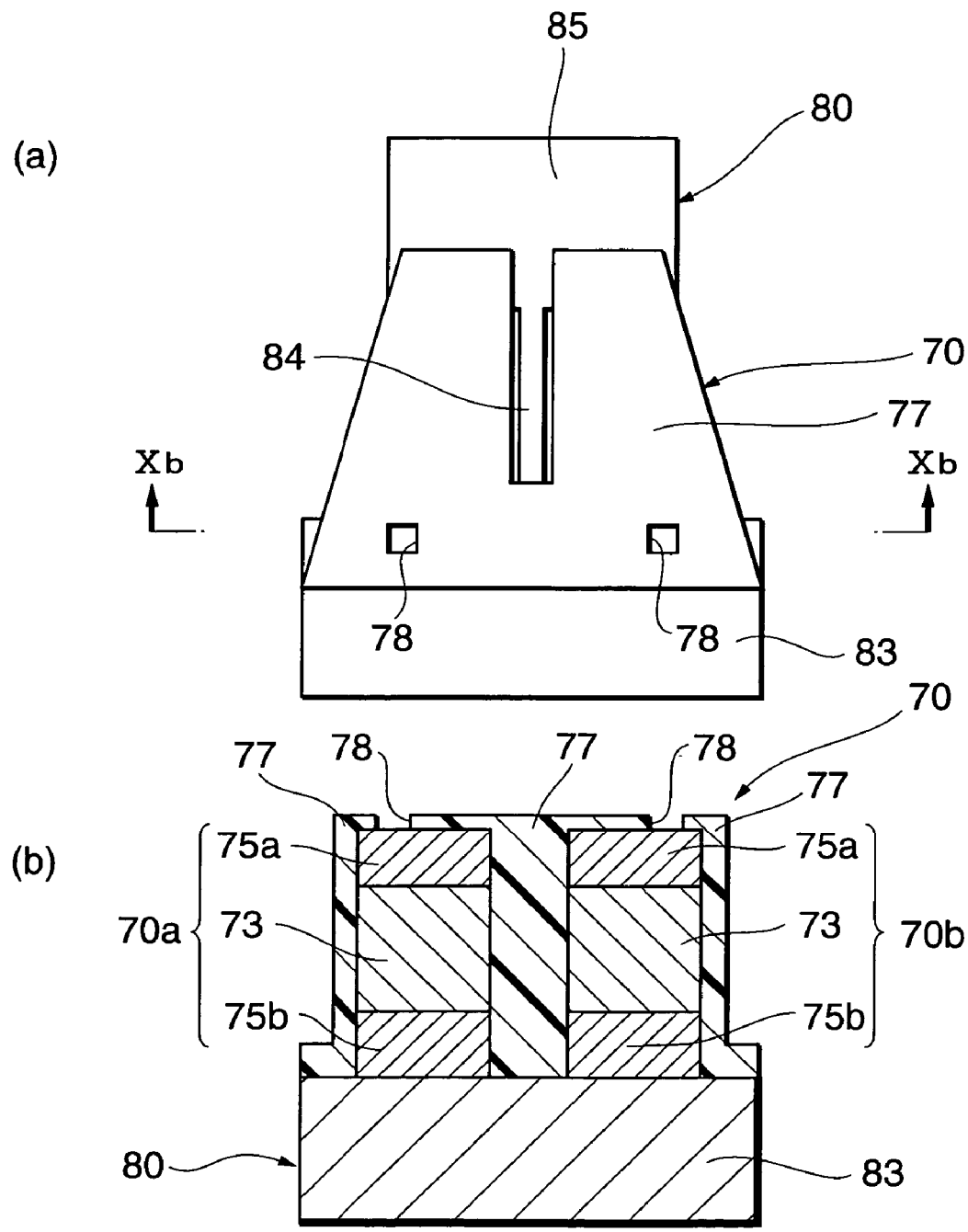
FIG. 10 is a schematic diagram for explaining the manufacturing process of the piezoelectric actuator.

A manufacturing process of the piezoelectric actuator 70 will be described below with reference to FIGS. 7 to 10. FIGS. 7 to 10 are schematic diagrams for explaining the manufacturing process of the piezoelectric actuator. FIG. 7(b) is a schematic diagram showing a sectional configuration along the direction VIIb-VIIb in (a) of FIG. 7. FIG. 8(b) is a schematic diagram showing a sectional configuration along the direction VIIIb-VIIIb in (a) of FIG. 8. FIG. 9(b) is a schematic diagram showing a sectional configuration along the direction IXb-IXb in (a) of FIG. 9. FIG. 10(b) is a schematic diagram showing a sectional configuration along the direction Xb-Xb in (a) of FIG. 10.

The piezoelectric actuator 70 is formed according to steps (1) to (4) below.

Step (1)

First, a substrate S of an electrically conductive metal (e.g., stainless steel or the like) is prepared. Then a thin film F1 of a material forming the second electrode film 75b, a thin film F2 of a material forming the thin film piezoelectric 73, and a thin film F3 of a material forming the first electrode film 75a are deposited in the order named on this substrate S to form a laminate L1 (cf. FIG. 7(a) and (b)). The thin films F1, F2 can be made, for example, of such metals as Pt and Ir, and such electrically conductive materials as electrically conductive oxides (e.g., IrO and others) and electrically conductive resins. The thin film F3 can be made, for example, of such a piezoelectric material as lead zirconate titanate (PZT) or barium titanate. A method of forming the thin films F1-F3 can be selected, for example, from such methods as sputtering, CVD, and laser ablation.

Step (2)

Then patterning of the laminate L1 is performed (cf. (a) and (b) of FIG. 8). In this step (2), resist films (not shown) are formed at the positions corresponding to the first region 70a and the second region 70b and the thin films F1-F3 are removed by etching, using the resist films as a mask. Subsequently, the resist films are removed.

The above steps (1) and (2) result in forming the second electrode films 75b, the thin film piezoelectrics 73, and the first electrode films 75a in the order named on the substrate S to form the first region 70a and the second region 70b.

Step (3)

In order to avoid corrosion of the second electrode films 75b, the thin film piezoelectrics 73, and the first electrode films 75a, a resin film 77 is then formed so as to cover the surfaces of the first region 70a and the second region 70b on the substrate S (cf. (a) and (b) of FIG. 9). The resin film 77 can be made, for example, using a material such as polyimide resin.

Then formed is a resist film (not shown) having apertures at the positions corresponding to the electrodes 71a, 71b. Using this resist film as a mask, the resin film 77 is removed by etching to form contact holes 78 in the resin film 77 (likewise, cf. (a) and (b) of FIG. 9). Subsequently, the resist film is removed.

Step (4)

Then the substrate S is processed into a predetermined shape, i.e., into the shape having the rear part 83, the connection 84, and the front part 85 (cf. (a) and (b) of FIG. 10). In this step (4), a resist film (not shown) is formed at the positions corresponding to the rear part 83, the connection 84, and the front part 85 and, using the resist film as a mask, the substrate S is removed by etching from the side opposite to the surface on which the piezoelectric actuator 70 (first region 70a and second region 70b) is formed. Subsequently, the resist film is removed. This results in forming the transfer plate 80 from the substrate S. Thereafter, the electrodes 71a, 71b (not shown) are formed. The removal of the substrate S results in exposing part of the second electrode film 75b, and this exposed part is also preferably covered by the resin film 77.

These steps (1) to (4) result in directly forming the piezoelectric actuator 70 on the transfer plate 80.

In the case where the piezoelectric actuator is of the double layer structure in which two thin film piezoelectrics are stacked, the manufacturing process includes additional steps of preparing another substrate (which does not have to be limited to the aforementioned stainless steel but may also be another material, e.g., a substrate of MgO) with a laminate L1, bonding the laminates L1 to each other with an adhesive with the thin films F3 facing each other, prior to the aforementioned step (2), and thereafter removing one of the substrates.

Subsequently, an example of an assembly process of HGA 30 will be described.

First, the flexure 60 is fixed to the load beam 53 by laser spot welding. Then the transfer plate 80 and the piezoelectric actuator 70 are fixed to the flexure 60 by connecting the electrodes 71a, 71b to the electrodes 66a, 64a and by connecting the rear part 83 of the transfer plate 80 to the electrode 65a. The piezoelectric actuator 70 is connected to the flexure 60 only at the positions of the electrodes 71a, 71b (electrodes 66a, 64a) and the transfer plate 80 is connected to the flexure 60 only at the position of electrode 65a. Therefore, the piezoelectric actuator 70 and the transfer plate 80 are in a floating state from the load beam 53.

Then the head slider 32 is bonded to the front part 85 of the transfer plate 80, thereby obtaining the HGA 30 of the present embodiment. It is also possible to adopt a method of first attaching the head slider 32 to the transfer plate 80, and thereafter mounting them on the suspension assembly 40.

The actuator arm 22 is coupled to the HGA 30 obtained as described above, to constitute the head stack assembly 20, and this is movably mounted over the hard disk 10, thereby fabricating the hard disk drive 1 of the present first embodiment.

In the present first embodiment, as described above, the piezoelectric actuator 70 is not bonded to the transfer plate 80, but is formed on the transfer plate 80. This eliminates the bonding step for fixing the piezoelectric actuator 70 to the transfer plate 80, thereby simplifying the production process.

In the first embodiment, the transfer plate 80 maintains the mechanical strength of the piezoelectric actuator 70 to prevent the piezoelectric actuator 70 from being broken. The piezoelectric actuator 70 is not handled alone but is handled together with the transfer plate 80, so as to facilitate handling thereof. This improves the yield.

These lead to considerable improvement in mass productivity in the first embodiment.

In the first embodiment, the piezoelectric actuator 70 is handled together with the transfer plate 80, which facilitates mounting of the piezoelectric actuator 70 onto the suspension assembly 40 (flexure 60).

In the manufacturing method according to the first embodiment, the piezoelectric actuator 70 is not bonded to the transfer plate 80, but the piezoelectric actuator 70 is formed on the substrate S and thereafter the substrate S is processed into the predetermined shape, thereby obtaining the transfer plate 80 with the piezoelectric actuator 70 formed thereon. This eliminates the bonding step for fixing the piezoelectric actuator 70 to the transfer plate 80, thereby simplifying the production process.

In the manufacturing method according to the first embodiment, the substrate S or the transfer plate 80 maintains the mechanical strength of the piezoelectric actuator 70 during the manufacturing process to prevent the piezoelectric actuator 70 from being broken. In addition, the piezoelectric actuator 70 is not handled alone but is handled together with the substrate S or the transfer plate 80, so as to facilitate handling thereof. These improve the yield.

In the manufacturing method according to the first embodiment, the thin film F1 of the material forming the second electrode film 75b, the thin film F2 of the material forming the thin film piezoelectric 73, and the thin film F3 of the material forming the first electrode film 75a are deposited in the order named on the substrate S to form the laminate L1, thereafter patterning of the laminate L1 is performed to form the piezoelectric actuator 70, and then the substrate S with the piezoelectric actuator 70 formed therein is etched from the side opposite to the surface where the piezoelectric actuator 70 is formed in the substrate S, so that the substrate S is formed into the predetermined shape (the shape having the rear part 83, the connection 84, and the front part 85). This makes it feasible to readily obtain the transfer plate 80 with the piezoelectric actuator 70 formed without being bonded.

In the manufacturing method according to the first embodiment, the resin film 77 is formed so as to cover the second electrode film 75b, the thin film piezoelectric 73, and the first electrode film 75a after formed. This can protect the second electrode film 75b, the thin film piezoelectric 73, and the first electrode film 75a after formed.

Figure 11:
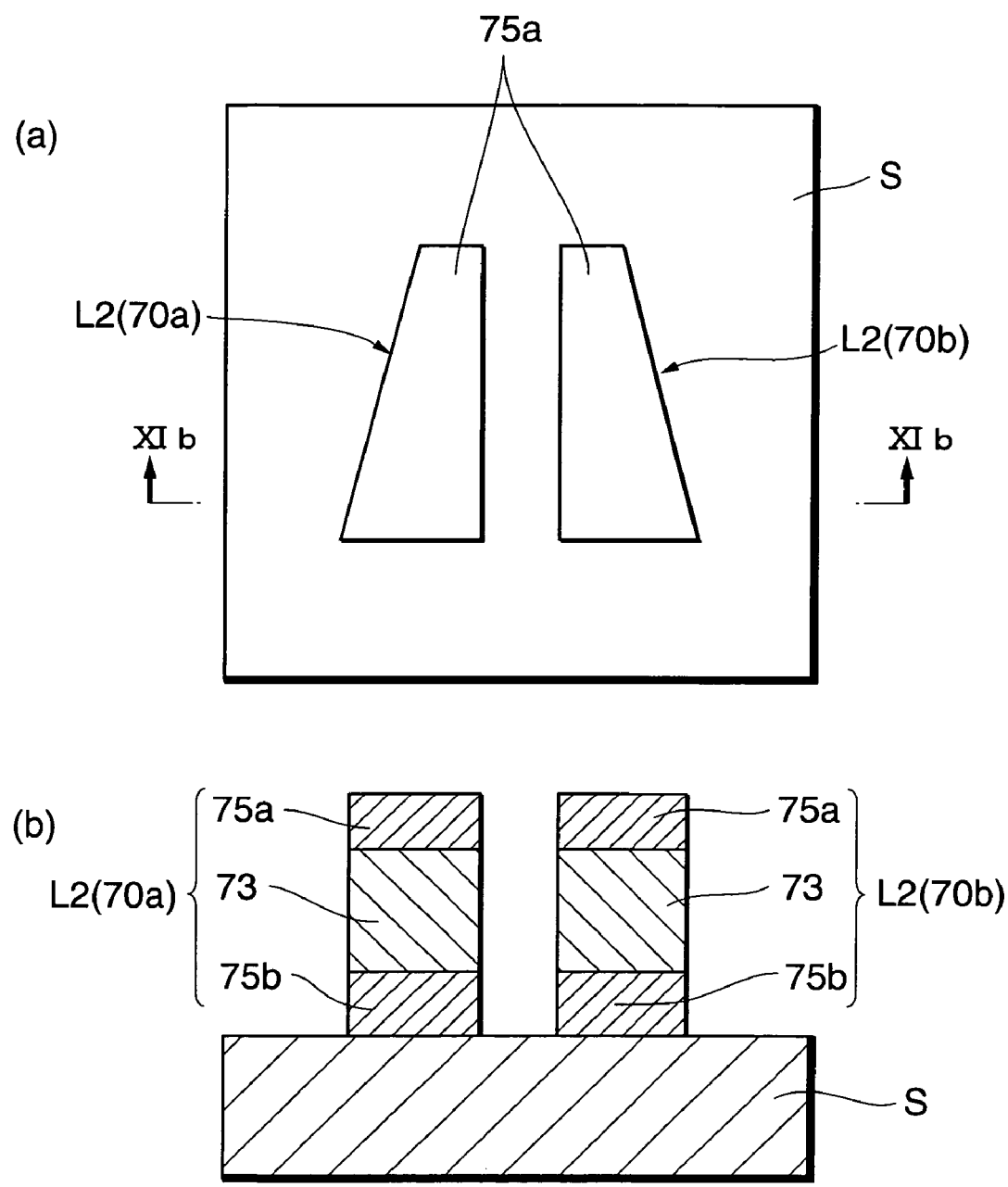
FIG. 11 is a schematic diagram for explaining a modification example of the manufacturing process of the piezoelectric actuator.

A modification example of the manufacturing process of the piezoelectric actuator 70 will be described below with reference to FIG. 11. FIG. 11 is a schematic diagram for explaining the modification example of the manufacturing process of the piezoelectric actuator. FIG. 11(b) is a schematic diagram showing a sectional configuration along the direction XIb-XIb in (a) of FIG. 11.

The piezoelectric actuator 70 is formed according to steps (1) to (3) below.

Step (1)

First, a substrate S is prepared. Then a material forming the second electrode film 75b, a material forming the thin film piezoelectric 73, and a material forming the first electrode film 75a are applied in the order named onto this substrate S, and in the shape corresponding to the first region 70a and the second region 70b to form laminates L2 (cf. (a) and (b) of FIG. 11). Then the laminates L2 are heated together with the substrate S to sinter each of the materials. The application of each material is carried out by making a slurry of each material and applying the slurry of the material by the doctor blade method.

The above step (1) results in forming the second electrode films 75b, the thin film piezoelectrics 73, and the first electrode films 75a in the order named on the substrate S to form the first region 70a and the second region 70b.

The steps (2) and (3) are the same as the steps (3) and (4) in the present embodiment described above, and thus the description thereof is omitted herein. These steps (1) to (3) result in directly forming the piezoelectric actuator 70 on the transfer plate 80.

As described above, the modification example of the manufacturing method of the first embodiment, similar to the aforementioned embodiment, eliminates the bonding step for fixing the piezoelectric actuator 70 to the transfer plate 80, thereby simplifying the production process. The yield is also improved.

In the modification example of the manufacturing method according to the first embodiment, the material forming the second electrode film 75b, the material forming the thin film piezoelectric 73, and the material forming the first electrode film 75a are applied in the order named onto the substrate S to form the laminates L2, thereafter the laminates L2 are sintered to form the piezoelectric actuator 70, and then the substrate S with the piezoelectric actuator 70 formed thereon is etched from the side opposite to the surface where the piezoelectric actuator 70 is formed in the substrate S, so that the substrate S is formed into the predetermined shape (the shape having the rear part 83, the connection 84, and the front part 85). This makes it feasible to readily obtain the transfer plate 80 with the piezoelectric actuator 70 formed without being bonded.

Second Embodiment

Figure 12:
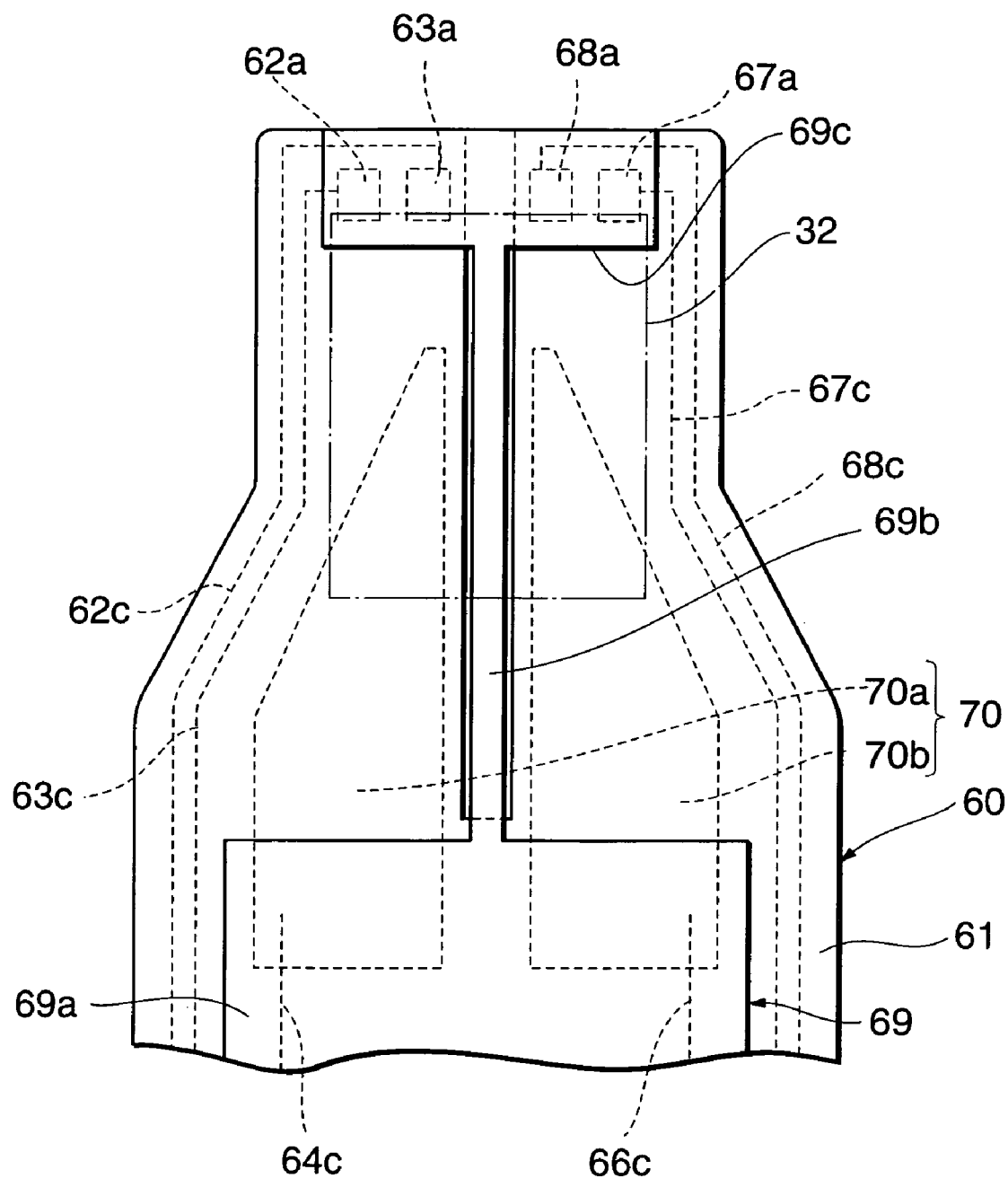
FIG. 12 is a plan view of a flexure included in an HGA and a hard disk drive in the second embodiment, from the side where the flexure is mounted on a support beam.

Next, a suspension assembly and a hard disk drive according to the second embodiment will be described with reference to FIG. 12. FIG. 12 is a view of the flexure 60 from the side where a support plate 69 is provided, i.e., from the side opposite to the support beam portion 50. The HGA and the hard disk drive of the second embodiment are different in the configuration of the flexure 60 and others from the HGA 30 and the hard disk drive 1 of the first embodiment.

In the HGA and the hard disk drive of the present second embodiment, as in the first embodiment, the flexure 60 has a flexible substrate 61, and a support plate 69 supporting at least a part of the substrate 61. The support plate 69 can be made, for example, of a metal such as stainless steel, or the like. The piezoelectric actuator 70 is formed on the support plate 69.

The support plate 69 has the tip side formed in almost T-shape, and has a thin and long beam portion 69b extending from a base 69a, and a tip portion 69c connected to the beam portion 69b. The tip portion 69c has a beltlike shape extending in the width direction.

The positional relation among the head slider 32, the piezoelectric actuator 70, and the support plate 69 will be described below with reference to FIG. 12. The head slider 32 is mounted on the flexure 60 so as to overlap with part of the beam portion 69b and with part of the tip portion 69c of the support plate 69. The piezoelectric actuator 70 is located on the support plate 69 and so positioned that the root part thereof where the electrodes 71a, 71b are located overlaps the tip part of the base 69a of the support plate 69 and that the tip part of the first region 70a and the second region 70b overlaps the head slider 32.

Figure 13:
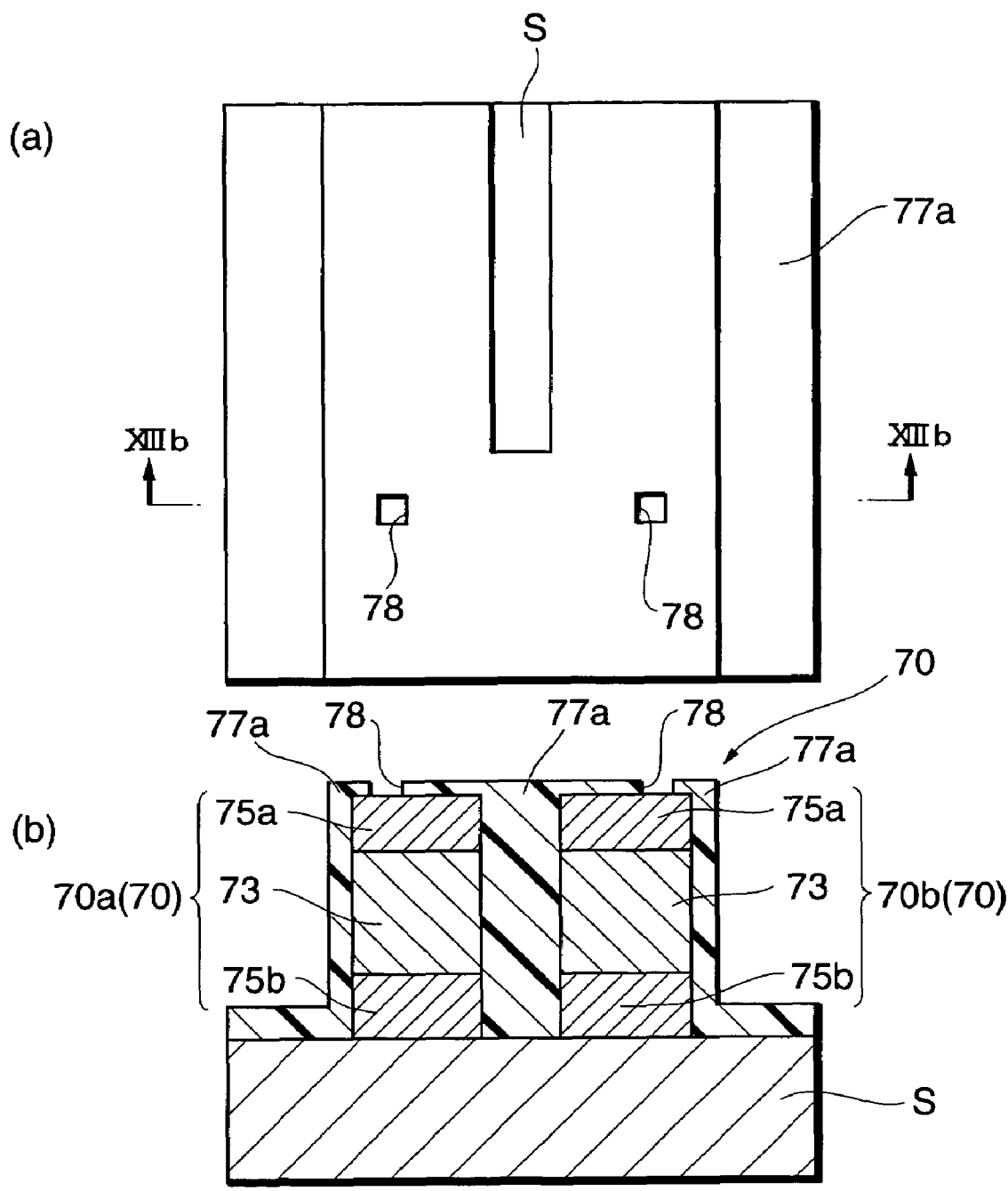
FIG. 13 is a schematic diagram for explaining a manufacturing process of a piezoelectric actuator.
Figure 14:
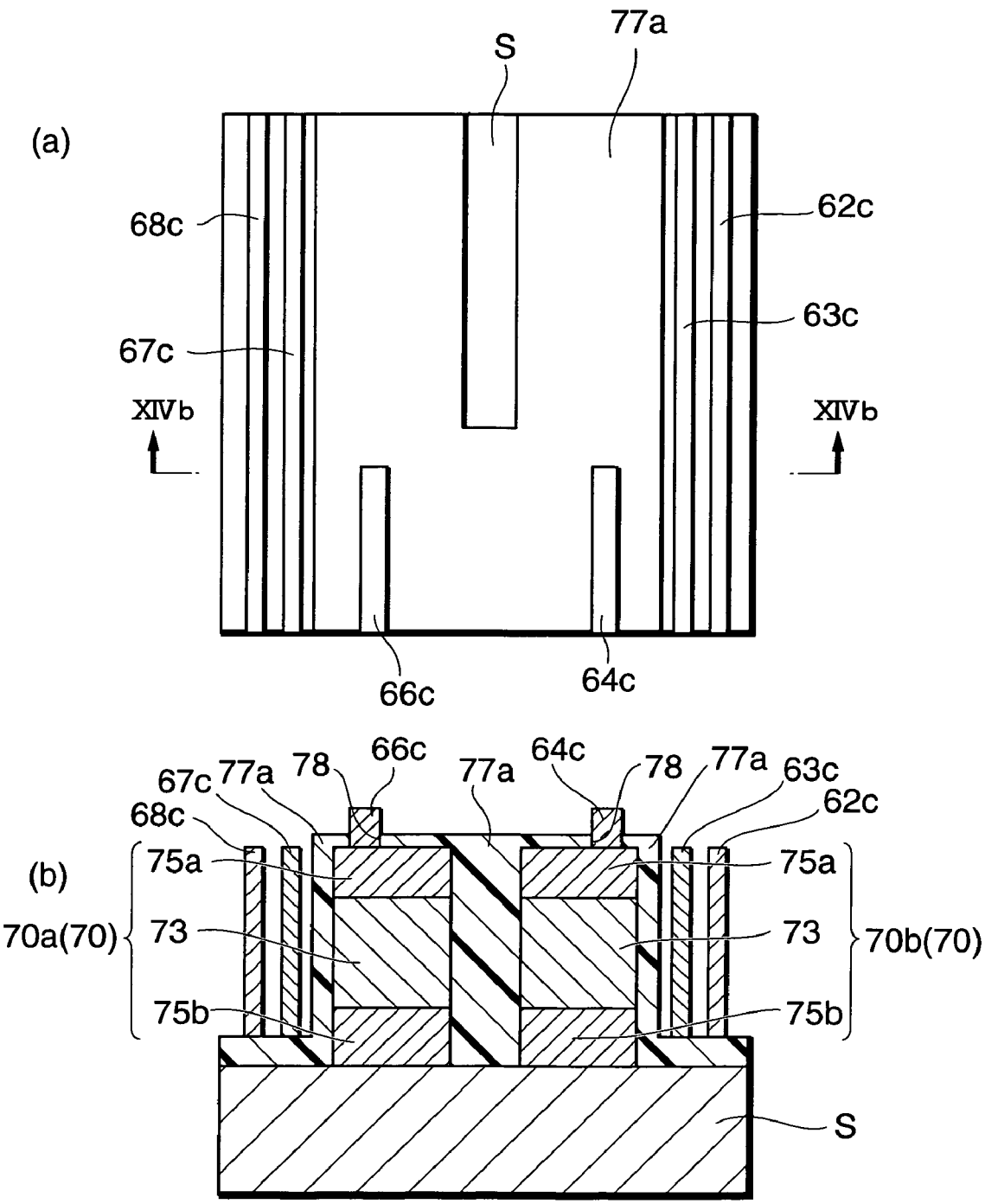
FIG. 14 is a schematic diagram for explaining the manufacturing process of the piezoelectric actuator.

Subsequently, a manufacturing process of the piezoelectric actuator 70 will be described with reference to FIGS. 13 to 16. FIGS. 13 to 16 are schematic diagrams for explaining the manufacturing process of the piezoelectric actuator. FIG. 13(b) is a schematic diagram showing a sectional configuration along the direction XIIIb-XIIIb in (a) of FIG. 13. FIG. 14(b) is a schematic diagram showing a sectional configuration along the direction XIVb-XIVb in (a) of FIG. 14. FIG. 15(b) is a schematic diagram showing a sectional configuration along the direction XVb-XVb in (a) of FIG. 15. FIG. 16(b) is a schematic diagram showing a sectional configuration along the direction XVIb-XVIb in (a) of FIG. 16.

The piezoelectric actuator 70 is formed according to steps (1) to (6) below. First, the steps (1) and (2) are the same as the steps (1) and (2) in the aforementioned first embodiment, and thus the description thereof is omitted herein.

Step (3)

Next, a first resin film 77a is formed on the substrate S so as to cover surfaces of a predetermined region of the substrate S, the first region 70a, and the second region 70b (cf. (a) and (b) of FIG. 13). The first resin film 77a can be made, for example, of a material such as polyimide resin, as the resin film 77 can.

Then a resist film having apertures at predetermined positions (not shown) is formed. Using this resist film as a mask, the first resin film 77a is removed by etching to form contact holes 78 in the first resin film 77a (likewise, cf. (a) and (b) of FIG. 13). Subsequently, the resist film is removed.

Step (4)

Then wires 62c-68c (among which the wire 65c is not shown) are formed (cf. (a) and (b) of FIG. 14). The wires 62c-68c can be formed by plating. The wires 64c, 66c are formed so that each wire is electrically connected through the contact hole 78 to the first electrode film 75a. The present second embodiment obviates the need for provision of the electrodes 71a, 71b and the electrodes 64a, 66a, because the wires 64c, 66c are formed so as to be directly connected to the first electrode films 75a.

Step (5)

Then a second resin film 77b is formed on the first resin film 77a so as to cover the wires 62c-68c (cf. (a) and (b) of FIG. 15). The second resin film 77b can be made, for example, of a material such as polyimide resin, as the resin film 77 and the first resin film 77a can. This results in forming a flexible substrate 61 including the first resin film 77a and the second resin film 77b, on the substrate S.

Step (6)

Then the substrate S is processed into a predetermined shape, i.e., the shape having the base 69a, the beam portion 69b, and the tip portion 69c (cf. (a) and (b) of FIG. 16). In this step (6), a resist film (not shown) is formed at the positions corresponding to the base 69a, the beam portion 69b, and the tip portion 69c, and, using the resist film as a mask, the substrate S is removed by etching from the side opposite to the surface where the piezoelectric actuator 70 (first region 70a and second region 70b) is formed. Subsequently, the resist film is removed. This results in forming the support plate 69 from the substrate S. Thereafter, electrodes 62a, 63a, 67a, and 68a (not shown) are formed. The removal of the substrate S results in exposing part of the second electrode film 75b, and this exposed part is also preferably covered by the first resin film 77a or by the second resin film 77b. In addition, the unrepresented wire 65c is electrically connected to the support plate 69.

These steps (1) to (6) result in forming the flexure 60 and directly forming the piezoelectric actuator 70 on the support plate 69.

In the present second embodiment, as described above, the piezoelectric actuator 70 is not bonded to the support plate 69 but is formed on the support plate 69. This eliminates the bonding step for fixing the piezoelectric actuator 70 to the support plate 69, thereby simplifying the production process.

In the second embodiment, the support plate 69 or the substrate S maintains the mechanical strength of the piezoelectric actuator 70, so as to prevent the piezoelectric actuator 70 from being broken. The piezoelectric actuator 70 is not handled alone but is handled together with the support plate 69 (flexure 60), thereby facilitating the handling thereof. These improve the yield.

These result in remarkably improving mass productivity in the second embodiment as in the first embodiment described above.

In the second embodiment, the piezoelectric actuator 70 is handled together with the support plate 69, so as to facilitate the mounting of the piezoelectric actuator 70 onto the suspension assembly 40.

In the manufacturing method according to the second embodiment, the piezoelectric actuator 70 is not bonded to the support plate 69, but the piezoelectric actuator 70 is formed on the substrate S, and then the substrate S is processed into the predetermined shape to obtain the support plate 69 with the piezoelectric actuator 70 formed thereon. This eliminates the bonding step for fixing the piezoelectric actuator 70 to the support plate 69, so as to simplify the production process.

In the manufacturing method according to the second embodiment, the substrate S or the support plate 69 maintains the mechanical strength of the piezoelectric actuator 70 during the manufacturing process to prevent the piezoelectric actuator 70 from being broken. In addition, the piezoelectric actuator 70 is not handled alone but is handled together with the substrate S or the support plate 69, so as to facilitate the handling thereof. These improve the yield.

In the manufacturing method of the second embodiment, the first resin film 77a is formed so as to cover the second electrode films 75b, the thin film piezoelectrics 73, and the first electrode films 75a after formed, the wires 62c-68c are formed on the first resin film 77a, and thereafter the second resin film 77b is formed on the first resin film 77a so as to cover the wires 62c-68c. This makes it feasible to protect the second electrode films 75b, the thin film piezoelectrics 73, the first electrode films 75a, and the wires 62c-68c after formed and to readily obtain the flexure 60 with the piezoelectric actuator 70.

The invention accomplished by Inventors was specifically described above on the basis of the embodiments thereof, but the present invention is by no means limited to the above embodiments. For example, a thin film magnetic head for performing only one of recording and reproduction may also be used instead of the thin film magnetic head for performing both of recording and reproduction with a recording medium.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A suspension assembly on which a head slider having a thin film magnetic head is to be mounted, the suspension assembly comprising:
   a piezoelectric actuator for displacing the head slider relative to the suspension assembly;
   a transfer plate facing the piezoelectric actuator on one side, facing the head slider on the other side, and arranged to transfer displacement of the piezoelectric actuator to the head slider; and
   a flexure having a flexible substrate on which electrodes are disposed, wherein
   the transfer plate has a rear part and a front part connected through a connection part, at least the rear part has electrical conductivity,
   the piezoelectric actuator is disposed on the transfer plate while the rear part is located so as to overlap a root part of the piezoelectric actuator and the front part is located so as to overlap a tip part of the piezoelectric actuator,
   the piezoelectric actuator comprises a piezoelectric film and a pair of electrode films placed so as to sandwich the piezoelectric film in between one electrode film and another electrode film of the pair of electrode films,
   the piezoelectric film and the pair of electrode films are formed in an order of one electrode film, the piezoelectric film and the other electrode film, the one electrode film being in contact with the rear part of the transfer plate,
   the piezoelectric actuator has an electrode disposed on the root part and electrically connected to the other electrode film,
   the piezoelectric actuator and the transfer plate are placed on the flexible substrate so that each of the rear part and the electrode disposed on the root part faces the corresponding electrode disposed on the flexible substrate, and
   each of the rear part and the electrode disposed on the root part is electrically connected to the corresponding electrode disposed on the flexible substrate.

2. The suspension assembly according to claim 1, wherein the transfer plate is made of an electrically conductive metal, and the rear part, the front part and the connection part are integrated.

3. The suspension assembly according to claim 1, wherein the transfer plate is formed by etching a metal substrate with the piezoelectric actuator formed thereon from a side opposite to a surface where the piezoelectric actuator is formed.

4. A hard disk drive comprising a recording medium; a head slider having a thin film magnetic head for performing at least one of recording and reproduction with the recording medium; and a suspension assembly on which the head slider is mounted,
   the suspension assembly comprising:
   a piezoelectric actuator for displacing the head slider relative to the suspension assembly;
   a transfer plate facing the piezoelectric actuator on one side, facing the head slider on the other side, and arranged to transfer displacement of the piezoelectric actuator to the head slider; and
   a flexure having a flexible substrate on which electrodes are disposed, wherein
   the transfer plate has a rear part and a front part connected through a connection part, at least the rear part has electrical conductivity,
   the piezoelectric actuator is disposed on the transfer plate while the rear part is located so as to overlap a root part of the piezoelectric actuator and the front part is located so as to overlap a tip part of the piezoelectric actuator,
   the piezoelectric actuator comprises a piezoelectric film and a pair of electrode films placed so as to sandwich the piezoelectric film in between one electrode film and another electrode film of the pair of electrode films,
   the piezoelectric film and the pair of electrode films are formed in an order of one electrode film, the piezoelectric film and the other electrode film, the one electrode film being in contact with the rear part of the transfer plate,
   the piezoelectric actuator has an electrode disposed on the root part and electrically connected to the other electrode film,
   the piezoelectric actuator and the transfer plate are placed on the flexible substrate so that each of the rear part and the electrode disposed on the root part faces the corresponding electrode disposed on the flexible substrate, and
   each of the rear part and the electrode disposed on the root part is electrically connected to the corresponding electrode disposed on the flexible substrate.

5. The hard disk drive according to claim 4, wherein the transfer plate is formed by etching a metal substrate with the piezoelectric actuator formed thereon from a side opposite to a surface where the piezoelectric actuator is formed.

6. The hard disk drive according to claim 4, wherein the transfer plate is made of an electrically conductive metal, and the rear part, the front part and the connection part are integrated.

* * * * *